(12) United States Patent
Larson et al.

(10) Patent No.: US 7,599,925 B2
(45) Date of Patent: Oct. 6, 2009

(54) USING QUERY EXPRESSION SIGNATURES IN VIEW MATCHING

(75) Inventors: Per-Ake Larson, Redmond, WA (US); David Edward DeHann, Waterloo (CA); Jingren Zhou, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 368 days.

(21) Appl. No.: 11/094,924

(22) Filed: Mar. 31, 2005

(65) Prior Publication Data

US 2006/0230017 A1    Oct. 12, 2006

(51) Int. Cl.
G06F 17/30    (2006.01)

(52) U.S. Cl. .................... 707/4; 707/2; 707/3
(58) Field of Classification Search ............ None
See application file for complete search history.

(56) References Cited

U.S. PATENT DOCUMENTS

| | | | | |
|---|---|---|---|---|
| 5,276,870 A | * | 1/1994 | Shan et al. | 707/2 |
| 5,544,355 A | * | 8/1996 | Chaudhuri et al. | 707/2 |
| 5,768,578 A | * | 6/1998 | Kirk et al. | 707/100 |
| 6,604,100 B1 | * | 8/2003 | Fernandez et al. | 707/3 |
| 2001/0013030 A1 | * | 8/2001 | Colby et al. | 707/1 |
| 2004/0006574 A1 | * | 1/2004 | Witkowski et al. | 707/104.1 |

* cited by examiner

*Primary Examiner*—Shahid A Alam
*Assistant Examiner*—Nirav K Khakhar
(74) *Attorney, Agent, or Firm*—Lee & Hayes, PLLC (57) ABSTRACT

A system for optimizing queries against a database is described. The system comprises a memo structure that encodes a plurality of query expressions. The system also includes a signature mechanism that enables an assignment of the query expressions into equivalence classes. Methods of using such a system are additionally provided.

10 Claims, 7 Drawing Sheets

(f) Initial Memo (g) Final Memo

| Operator | Signature |
|---|---|
| Table/view | $S_t = [F; t; \{V \mid t \in T_V\}]$ |
| Select | $S_{\sigma(Q)} = \begin{cases} S_Q & \text{if } G_Q = F \\ \emptyset & \text{otherwise} \end{cases}$ |
| Project | $S_{\pi(Q)} = \begin{cases} S_Q & \text{if } G_Q = F \\ \emptyset & \text{otherwise} \end{cases}$ |
| Join | $S_{Q_1 \bowtie Q_2} = \begin{cases} [F; T_{Q_1} \cup T_{Q_2}; C_{Q_1} \cap C_{Q_2}] & \text{if } G_{Q_1} = G_{Q_2} = F \\ \emptyset & \text{otherwise} \end{cases}$ |
| Group-by | $S_{\gamma(Q)} = \begin{cases} [T; T_Q; C_Q] & \text{if } G_Q = F \\ \emptyset & \text{otherwise} \end{cases}$ |
| Other | $S_Q = \emptyset$ |

USING QUERY EXPRESSION SIGNATURES IN VIEW MATCHING

TECHNICAL FIELD

The present invention relates generally to database systems, and more particularly to systems and methods for optimizing database queries.

BACKGROUND

Modern databases often contain vast amounts of information. Even given the computing power and speed of modern computing hardware, queries against a large database can sometimes take several hours to perform. These queries can be computationally intensive both because of the large amount of data that must be processed and because data manipulation operations necessary applied to the data can be complex and are computationally expensive in and of themselves.

To reduce the computational tasks necessary to extract useful information from a database, a number of techniques have been developed, such as the use of materialized views and the optimization of user queries. When optimizing a user query, a query optimizer typically rewrites a query entered by a user into a form that is less computationally expensive to perform through a series of substitutions of equivalent expressions. Ideally, the final resulting query is in a form that represents the most efficient way of computing the result that the user desires.

Materialized views are commonly described as queries that are chosen by a database administrator to be precomputed from base tables because of a high likelihood that either that query, or similar queries, will be submitted to the database system. To the extent that a query can exploit prior computational work by computing part or all of a query from a materialized view, there is an efficiency gain. Any efficiency gain can have significant effects on computation time. Therefore, queries that make use of materialized views can be more efficient than those that reference base tables.

In many database systems, materialized views are only allowed to reference base tables. Stacked views, or views on views, refer to materialized views that may reference base tables and also other materialized views. As with typical materialized views, appropriate use of stacked views can provide efficiency gains and significantly reduce processing time. However, allowing stacked views creates additional complexities and in particular makes it difficult for a query optimizer to quickly and efficiently rewrite a query into a form that references stacked views. Therefore, there is a need for a system and method of optimizing queries so that benefits of using stacked views can be obtained.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later. Additionally, section headings used herein are provided merely for convenience and should not be taken as limiting in any way.

In accordance with one aspect of the invention, a signature data structure is provided that contains a synopsis of a set of expressions that can be extracted from a query optimizer's memo structure. The synopsis allows for a ready determination whether a matchable query expression that has certain tables or views as inputs can be extracted from the memo and if so, whether the expression is grouped. There may be multiple signatures associated with a set of expressions. Lack of a signature for an expression indicates that the expression is not of a matchable form.

In accordance with another aspect of the invention, a query optimizer accesses a signature as part of a process of rewriting a user query into an optimized query that can be quickly and efficiently processed in a database. By exploiting signatures, a query optimizer can eliminate searches for expressions that are not matchable or expressions for which no matching view currently exists. A more efficient query optimizer improves the overall efficiency of the database system.

In accordance with yet another aspect of the invention, expression signatures enable a query optimizer to reliably and efficiently recognize opportunities to rewrite user queries into forms that reference one or more stacked materialized views. Such a query optimizer allows for better view matching and better use of stacked materialized views, thereby providing higher cost savings by using precomputed results rather than having to fully recompute results for each query.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION

The subject invention relates to systems and methods to facilitate the optimization of query expressions through improved view matching. As used in this application, terms "component," "system," and the like are intended to refer to a computer-related entity, either hardware, software (e.g., in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention. Additionally, although specific examples set forth may use terminology that is consistent with client/server architectures or may even be examples of client/server implementations, skilled artisans will appreciate that the roles of client and server may be reversed, that the subject invention is not limited to client/server architectures and may be readily adapted for use in other architectures, specifically including peer-to-peer (P2P) architectures, without departing from the spirit or scope of the invention.

Figure 1:
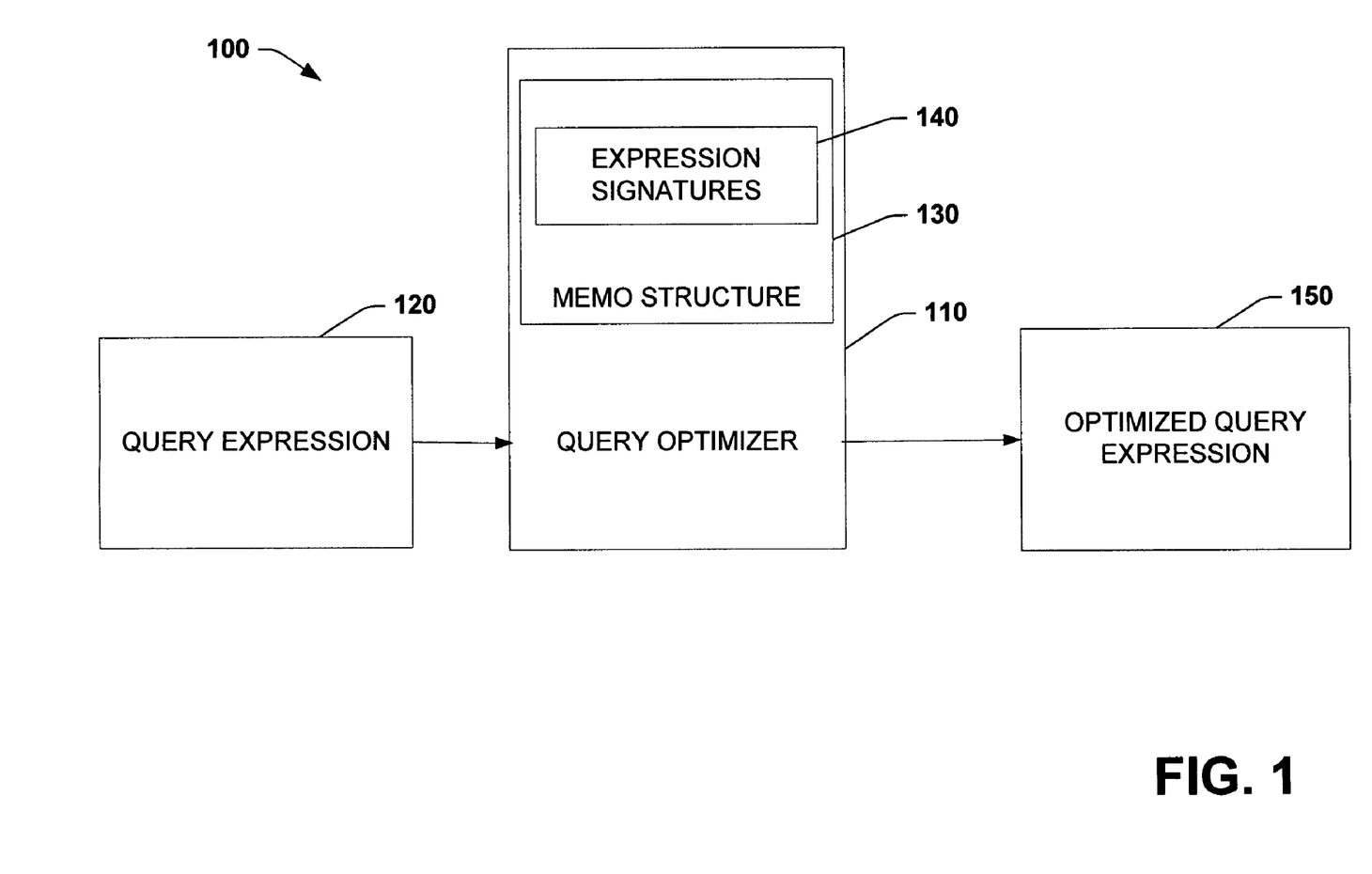
FIG. 1 is a system block diagram of a query optimization system in accordance with an aspect of the disclosed invention.
Figure 2:
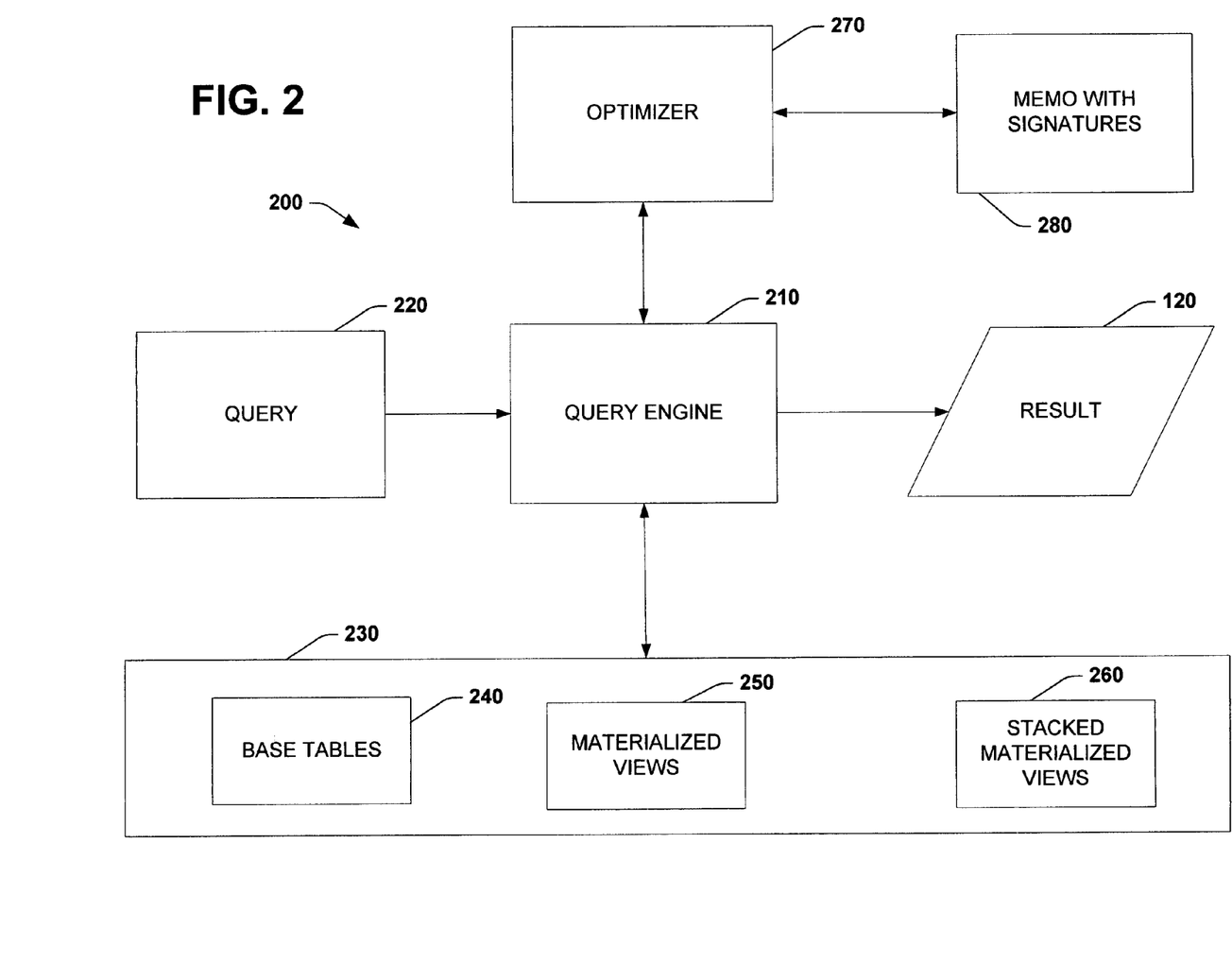
FIG. 2 is a system block diagram of a database query system in accordance with another aspect of the invention.

FIGS. 1 and 2 present a general architecture for a query optimization system in accordance with aspects of the invention to assist in setting a context for later, more detailed discussion. FIG. 1 is a system block diagram of a query optimization system 100 in accordance with one aspect of the invention. A query optimizer 110 receives a query expression 120 that typically originates from a SQL query input by a user or an application program. The task of the query optimizer is to convert the input expression to a logically equivalent optimized expression 150 that can be evaluated more efficiently. The query optimizer makes use of a memo structure 130 that compactly stores the various expression trees generated during optimization. Expression signatures 140 are contained in the memo structure and are used by the optimizer during optimization to facilitate view matching.

A signature is essentially a synopsis of expressions that can be obtained from a memo. By making use of the signatures 140, the query optimizer 110 is able to avoid exploration of parts of the search space as it attempts to create an efficient rewritten query. Throughout this disclosure, examples provided will focus primarily on a transformation-based optimizer. However, those of ordinary skill in the art of database query optimization will recognize that the systems and methods described can be adapted for use with other types of optimizers, such as optimizers relying on bottom-up dynamic programming, without departing from the scope or spirit of the subject invention. By referencing the signatures 140 and applying one or more transformation or matching rules, the query optimizer 110 ultimately creates an optimized query expression 150 for use during query execution. The final optimized expression 150 is also commonly referred to as a query plan. Ideally, an optimized query such as the optimized query 150 is the most efficient way to obtain results requested by the user but because of a variety of factors that is not always the case. Thus as used herein, the term optimized query is used interchangeably with the term rewritten query as appropriate in, or required by, the surrounding context.

FIG. 2 is a system block diagram of a database query system 200 in accordance with another aspect of the invention. A query engine 210 is configured to receive a query 220 from a user. The query engine 210 is able to access a number of data sources 230 such as base tables 240, materialized views 250, and stacked materialized views 260. The query engine 210 is also coupled to an optimizer 270 that employs a memo structure with signatures 280. The query engine 210 then outputs a result 290.

In operation, the query engine 210 receives the query 220 from a user and passes the query 220 to the optimizer 270. The optimizer 270 uses the memo structure and its signatures 280 while rewriting the query 220 to produce a query plan that ideally minimizes the amount of computation necessary to obtain the result desired by the user. Once the optimizer 270 has created a query plan, it passes that query plan to the query engine 210. The query engine 210 then accesses appropriate sources among the data sources 230 as specified by the query plan and performs calculations called for by the query plan to obtain the result 290. The query engine 210 then outputs the result 290 to the user.

To leverage the potential of materialized views, a query optimizer in accordance with certain aspects of the invention must be able to rewrite queries against base tables into equivalent queries that use one or more materialized views. For a rewrite of this type to remain correct, information stored in a view must remain synchronized with data in base tables upon which the view depends. For clarity and ease of discussion, discussion will focus on views that are defined by SQL queries composed of only select, project, and join operators over base tables with an optional group-by operator that is limited to aggregation functions (e.g., sum or count) that can be computed incrementally. This class of expressions is referred to as SPJG queries or views, or materialized views, as appropriate.

An extension of this class that relaxes the restriction that SPJG queries refer only to base tables and allows references to other materialized views is called a stacked SPJG view, or S-SPJG view. The expansion of an S-SPJG view definition is a multi-block SQL query with nesting in the from clause, referred to as an S-SPJG query. Stacked views can be used to increase the number of options available for use by the query optimizer when rewriting complex queries by allowing more complex query expressions to be materialized. Example 1 illustrates some of the performance gains that can be realized thereby:

EXAMPLE 1

A sample query against a parts database contains two levels of aggregation and attempts to find important parts. A part is important if it contributed at least 90% of the value of an order. The fact that the query has two levels of aggregation means that the query cannot be well supported by SPJG views only. For brevity, np (net price) is used in place of the expression l_extendedprice*(1+l_tax)*(1−l_discount).

Q: select l_partkey, count(*) ocnt, sum(sp) oval
from orders,
   (select sum(np) sp, l_orderkey, l_partkey
   from lineitem
   group by l_orderkey, l_partkey) as x
where o_orderkey=l_orderkey
and o_totalprice*0.9<sumprice
group by l_partkey
$V_1$: select sum(np) sp, l_orderkey, l_partkey
from lineitem
group by l_orderkey, l_partkey
$V_2$: select l_partkey, count(*) ocnt, sum(sp) oval
from orders, $V_1$
where o_orderkey=l_orderkey
and o_totalprice*0.9<sumprice
group by l_partkey The query of Example 1, when run against a sample 10 Gb database without any supporting views, in one exemplary implementation, required 9877 seconds to run, that is, almost 2 hours 45 minutes. When SPJG views were allowed, a materialized view $V_1$ was created that reduced the execution time to 349 seconds. When stacked SPJG views were allowed, a view $V_2$ was created that combined orders and $V_1$. The original query was then reduced to a scan of $V_2$ with an execution time of 4.5 seconds.

To reduce the execution cost of a complex query that is expressed over base tables, the query optimizer 270 must be able to rewrite the query 220 as a logically equivalent expression that uses applicable materialized views. The process of rewriting a query must be correct, efficient, cost-based, and as complete as possible. Rewriting a query to use a view, or view matching, can be accomplished by a transformation-based optimizer in accordance with the subject invention.

Transformation-based optimizers usually generate rewritings by applying local transformation rules on subexpressions of a query. Applying a rule thus produces substitute expressions that are equivalent to the original expression. View matching, or computing a subexpression from materialized views, is one transformation rule. The view matching rule uses a view matching procedure to determine whether the original expression can be computed from one or more existing materialized views. If so, substitute expressions are generated. The view matching rule is invoked on every subexpression with a root operator that is acceptable as a root operator of an SPJG expression, for example, a join operator. Matching is performed on the normalized query and view expressions. The normal form is a Cartesian product followed by a select, followed then by an optional group-by operation. Conceptually, the view matching process treats a materialized view in a query expression as any other table. View matching occurs bottom-up.

An example provided herein uses two materialized views. View $V_1$ is an SPJG view and view $V_2$ is an S-SPJG view that references $V_1$. A query Q references only base tables but can be computed from $V_2$. Assuming that necessary transformation rules are applied, the optimizer derives an equivalent query $Q_1$ containing an SPJG subexpression $E_1$ that is computable from $V_1$. The view matching rule applied to $E_1$ will match $V_1$, generating a new query $Q_2$ that references $V_1$ and possibly one or more base relations. Optimization of $Q_2$ then derives a new query $Q_3$ containing an SPJG subexpression $E_2$ computable from $V_2$. As long as references to views and tables in $E_2$ are treated in the same way, application of the view matching rule to $E_2$ will find a match and generate a query $Q_4$ that references $V_2$. In short, a level n stacked SPJG view can be matched using the standard view matching rule after all views of level n−1 upon which it depends have been matched. Although the optimizer uses an operator tree representations, for discussion the example shows transformations using SQL syntax.

EXAMPLE 2

A sample query is made of a database that includes the following three views:
$V_1$: create view q11v1 with schemabinding as
select n_name, ps_partkey,
   sum(ps_supplycost*ps_availqty) as value,
   count_big(*) as cnt
from dbo.partsupp, dbo.supplier, dbo.nation
where ps_suppkey=s_suppkey
and s_nationkey=n_nationkey
group by n_name, ps_partkey
$V_2$: create view q11v2 with schemabinding as
select n_name, sum(value) as value-by-nation,
   count_big(*) as cnt
from dbo.q11v1
group by n_name
$V_3$: create view q11v3 with schemabinding as
select v1.n_name, ps_partkey, value
from dbo.q11v1 v1, dbo.q11v2 v2
where v1.n_name=v2.n_name
and value>value_by_nation*0.0001

The original form of a query q11 that takes one parameter a country name represented as @p1, is as follows:
Q: select ps_partkey,
sum(ps_supplycost*ps_availqty) as val
from partsupp, supplier, nation
where ps_uppkey=s_suppkey
and s_nationkey=n_nationkey
and n_name=@p1
group by ps_partkey
having sum(ps_supplycost*ps_availqty)>
   (select sum(ps_supplycost*ps_availqty)*0.001
   from partsupp, supplier, nation
   where ps_suppkey=s_suppkey
   and s_nationkey=n_nationkey
   and n_name=@p1)
order by val desc Both the outer query block and the query block in the having clause can be computed from view q11v1 to produce query $Q_1$:
$Q_1$: select ps_partkey, sum(value) as val
from q11v1
where n_name=@p1
group by ps_partkey
having sum(value)>
   (select sum(value)*0.0001
   from q11v1 where n_name=@p1)
order by val desc Next, aggregation in the outer query block is eliminated. The column set (n_name, ps_partkey) is a key of view q11v1. Therefore, ps_partkey is a key of the result obtained after applying the selection predicate (n_name=@p1) to q11v1. Therefore, because the aggregation will have no effect it can be eliminated. Application of this rule produces $Q_2$:
$Q_2$: select ps_partkey, value as val
from q11v1
where n_name=@p1
and value>
   (select sum(value)*0.0001
   from q11v1 where n_name=@p1)
order by val desc When view matching is applied next to $Q_2$, the process will determine that the subquery can be computed from view q11v2. No aggregation is needed because the view is already aggregated on n_name. Substitution produces query $Q_3$:

$Q_3$: select ps_partkey, value
  from q11v1
  where n_name=@p1
  and value>
    (select value-by-nation*0.0001
    from q11v2 where n_name=@p1)
  order by value desc The subquery block from $Q_3$ outputs one row at most because n_name is the key for view q11v2. The subquery can thus be converted to a join. This transformation produces query $Q_4$ which has a single query block with one join:

$Q_4$: select ps_partkey, value
  from q11v1 v1, q11v2 v2
  where v1.n_name=@p1
  and v2.n_name=@p1
  and value>value-by-nation*0.0001
  order by value desc When view matching is again applied, this time to $Q_4$, it is determined that the query can be computed from q11v3 using a simple select, recognizing that the predicate (v1.n_name=@p1 and v2.n_name=@p1) is equivalent to (v1.n_name=v2.n_name and v1.n_name=@p1). The final transformation yields $Q_5$:

$Q_5$: select ps_partkey, value
  from q11v3
  where n_name=@p1
  order by value desc Ideally, when using a transformation-based optimizer, there are no interdependencies between or among rules. However, some applications of transform rules can lead to redundant derivations of expressions arrived at by different paths. Therefore, the application of one rule may disable the use of other rules on the resulting expression. However, because this consequence can interfere with multi-level view matching, after a view is successfully matched appropriate transform rules should be re-enabled for the next phase. Similarly, the use of heuristics can interfere because view matching depends on other rules to generate matchable expressions.

Some transformation rules that are of limited value in standard optimizations may have greater value for matching views. It is important to have effective rules for manipulating group-by operators so that appropriately-scoped blocks of the view and query can be compared. New rules may be needed for obscure scenarios such as combining adjacent group-by operators that arise because extra group-by operators may be introduced as compensation during matching of a lower level view.

Another problem arises with missed bindings. Transformation-based optimizers encode a set of explored operator trees within a memo structure that consolidates common expressions. The memo includes groups and group expressions. A group expression is a single query operator that references its inputs by group number. A group is a set of equivalent group expressions. Generally, the memo does not contain cycles and is essentially a directed acyclic graph that contains many operator trees.

Transformation rules operate on regular operator trees where the inputs to the operator are other operators and not group numbers. The process of extracting an operator tree from the memo that satisfies the input pattern of a particular transform rule is referred to as obtaining a valid binding for the rule. With the SPJG view matching rule, all valid bindings from a given root group expression are SPJG operator trees over the same set of base tables. Because matching operates on the normalized form that is independent of operator ordering, the rule only needs to be applied to a single binding. However, when stacked views are used, this property is no longer true. Bottom-up application of view matching may cause valid bindings with matchable expressions to be missed. Therefore, the optimizer needs to be able to efficiently locate input-distinct bindings or bindings of SPJG operator trees that refer to different sets of input sources, either tables or views.

The use of signatures assists the optimizer in finding input-distinct bindings when matching stacked views and estimate the potential that exploration of a group expression will cause one or more materialized views to be matched. A signature is defined as follows:

Definition: A signature $S_Q$ exists for a bound operator tree Q iff Q represents an SPJG expression. If $S_Q$ exists, it is a ternary tuple $S_Q=[G_Q; T_Q; C_Q]$ where:
  $G_Q$ is a boolean indicating whether the root of Q is a group-by operator;
  $T_Q$ is the set of input sources (tables and views) in Q; and
  $C_Q$ is the set of candidate views for Q. A materialized view V is a candidate for Q iff $T_Q \in$ Tv. This component is optional.

Figure 3:
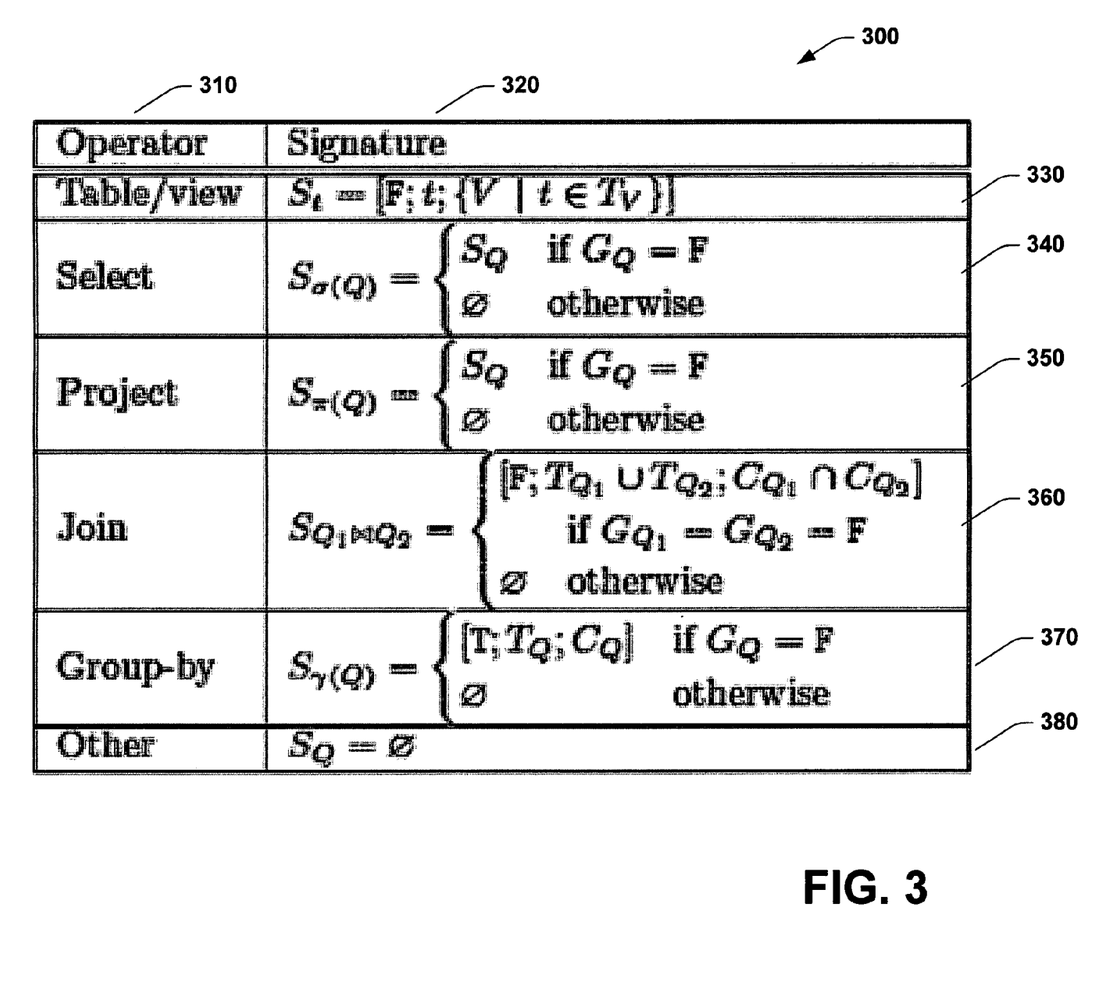
FIG. 3 is a depiction of a table including signature operators.

SPJG signatures for an operator tree can be computed efficiently by traversing the tree using post-order traversal and applying the appropriate rules at each node. FIG. 3 is a table 300 depicting the appropriate rules for each operator type. The table 300 is arranged into an Operator column 310 that lists the operators for which signature functions may be selected and a Signature column 320 that lists corresponding rules to be applied for each operator. Reading across rows allows for the identification of the appropriate operator and its corresponding signature functions. Each of the necessary operators is represented: table/view in row 330, select in row 340, project in row 350, join in row 360, and group-by in row 370. Row 380 is an catch-all for any other operator type, in which case the rule is to produce a null binding.

A group signature set is defined as follows:
Definition: For a group expression e (group g), the signature set $\Sigma e$ ($\Sigma g$) is the set of signatures for the roots of all bound operator trees extractable from group expression e (all group expressions in group g).

More formally, for memo group g:

$$\Sigma g = \{\Sigma e | e \in g\}$$

and for group expression e:

$$\Sigma e = \{St | t \in \text{trees}(e)\}$$

where trees(e) is the set of all operator trees with e as the root that can be extracted from the memo.

For a group expression e in the memo, the signatures depend on the operator type, that is, whether e is a terminal (e=t), a unary operator (e=α(g)), or a binary operator (e=β($g_1$, $g_2$)). The signature sets for group expression e can then be computed as $$\Sigma_t = \{S_t\}$$

$$\Sigma_{\alpha(g)} = \{S_{\alpha(Q)} | Q \in \text{trees}(g)\}$$

$$\Sigma_{\beta(g1,g2)} = \{S_{\beta(Q1,Q2)} | Q_1 \in \text{trees}(g_1), Q_2 \in \text{trees}(g_2)\},$$

respectively, where trees(g) is the set of all operator trees that can be extracted from group g. Sα(Q) and Sβ($Q_1$, $Q_2$) are references for the appropriate unary and binary operations from the table of FIG. 3. Because the signature of a node depends on the node's operator type and the signatures of its immediate children, it is sufficient to enumerate the signature sets of the input groups rather than enumerating all possible input trees to a group expression.

Figure 4:
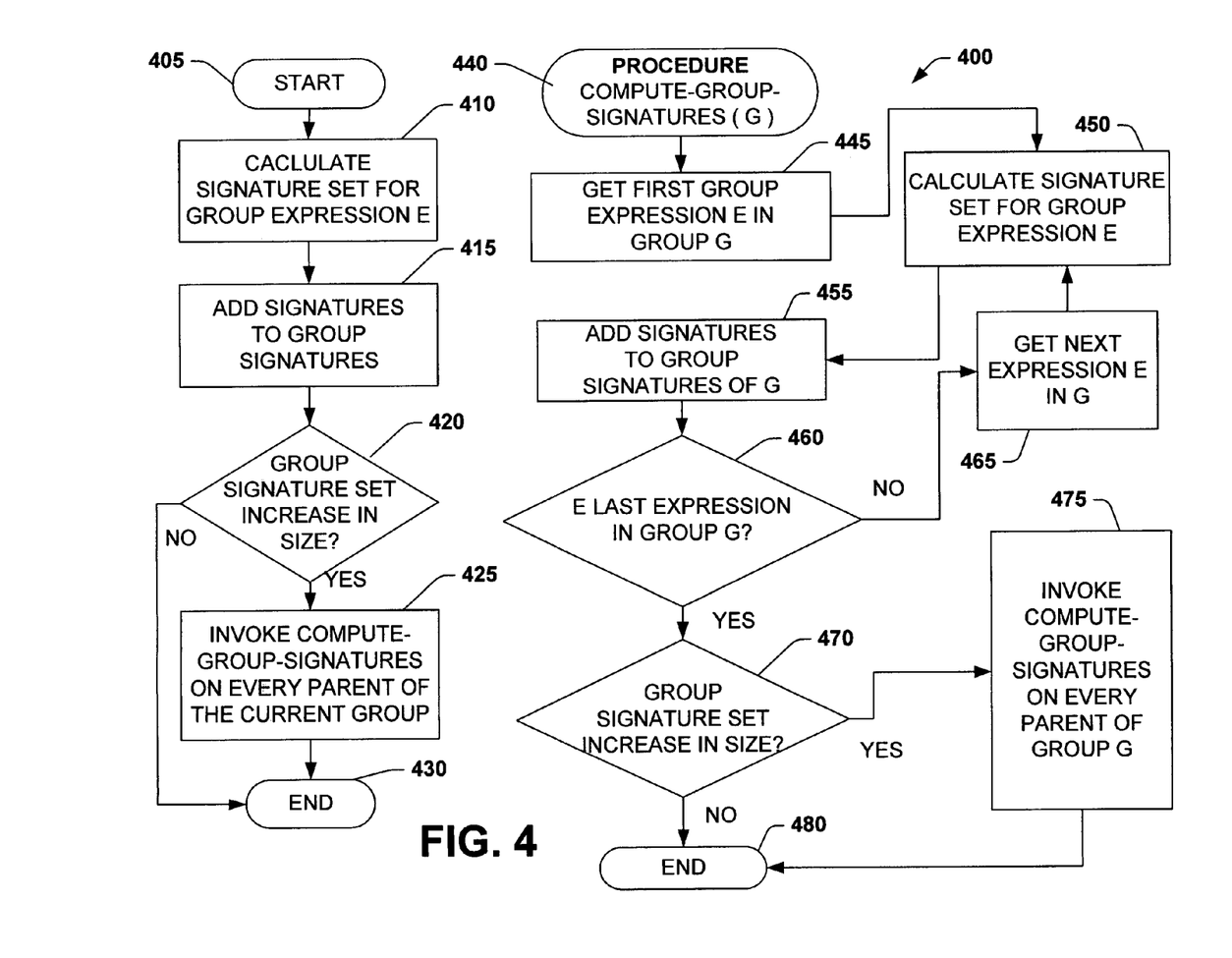
FIG. 4 is a flow diagram depicting a process in accordance with another aspect of the invention.

FIG. 4 is a flow diagram depicting a general procedure 400 for updating affected signatures whenever a new group expression e is inserted into the memo. Processing begins at START block 405 when a new group expression e has been added to a group. A signature set $\Sigma_e$ is calculated from the signature sets of the input groups at process block 410. At process block 415 the signature set $\Sigma_e$ is added to $\Sigma^{group(e)}$. At decision block 420 a determination is made whether the prior addition increased the size of $\Sigma^{group(e)}$. If no, processing terminates at END block 430. If yes, procedure Compute-Group-Signatures, beginning at block 440, is invoked on each of the parent groups of the current group. A group p is a parent of another group g if group p contains at least one group expression that references group g. Processing terminates at block 430 after procedure Compute-Group-Signatures has completed. Procedure Compute-Group-Signatures is a recursive procedure that recomputes the signatures of all potentially affected groups and group expressions. The procedure takes a group identifier g as parameter. Processing begins with the first group expression of group g at block 445. The signature set of the group expression is calculated in block 450 and added to the group signatures in block 455. Block 460 tests whether the last group expression has been reached. If no, processing proceeds to the next expression of the group in block 465. When all expressions of the group have been processed, it is determined in block 470 whether the set of group signatures increased. If no, the procedure ends at END block 480. If yes, the procedure recursively calls itself on each of the parents of the current group in block 475 before terminating at END block 480.

Figure 5:
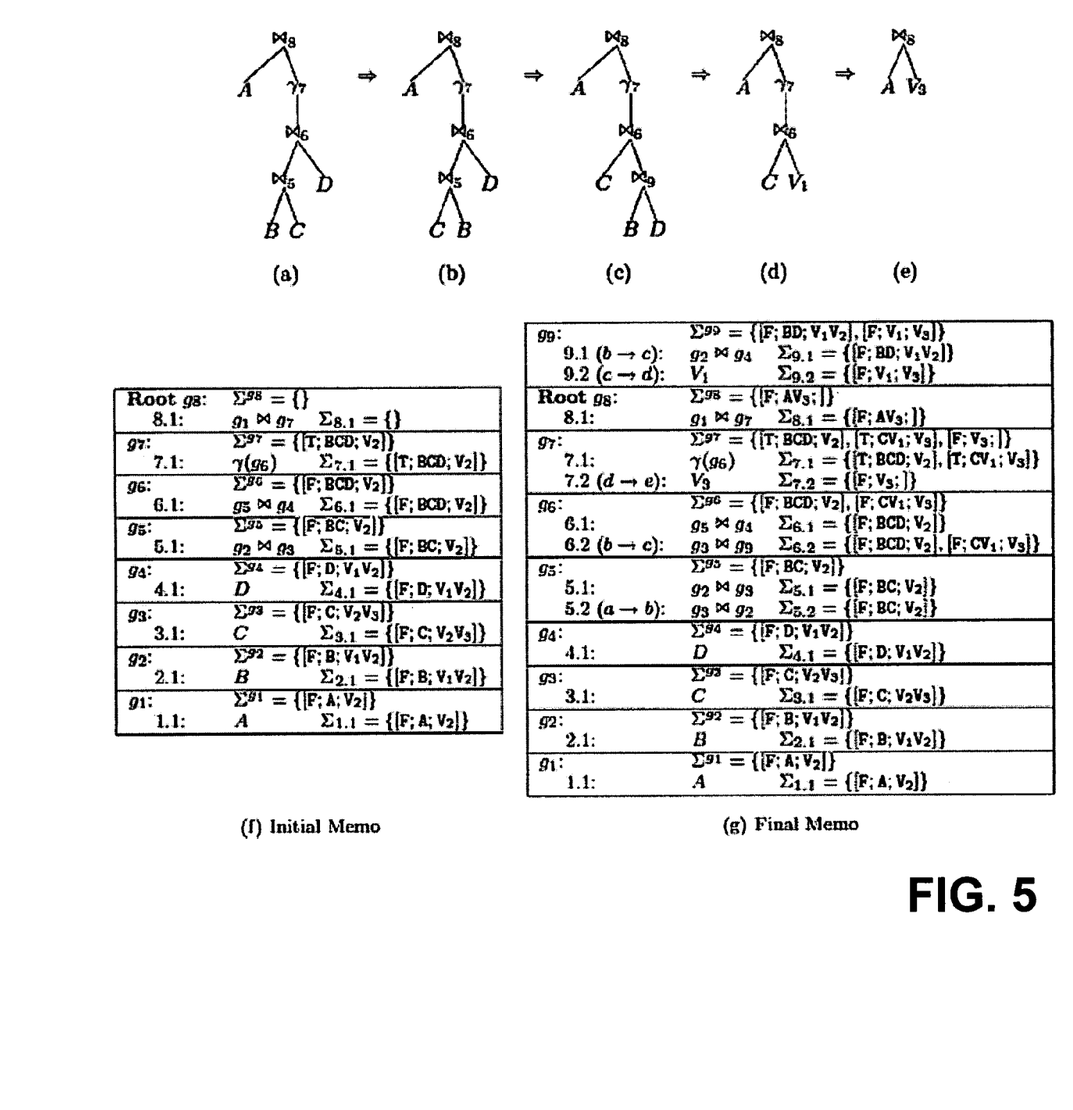
FIG. 5a is a tree depicting a stage of a transformation process in accordance with an aspect of the invention.
FIG. 5b is a tree depicting a stage of a transformation process in accordance with a further aspect of the invention.
FIG. 5c is a tree depicting a stage of a transformation process in accordance with a still further aspect of the invention.
FIG. 5d is a tree depicting a stage of a transformation process in accordance with yet another aspect of the invention.
FIG. 5e is a tree depicting a stage of a transformation process in accordance with a still further aspect of the invention.
FIG. 5f is a memo schema depicting a stage of a transformation process in accordance with an aspect of the invention.
FIG. 5g is a memo schema depicting another stage of a transformation process in accordance with an aspect of the invention.

Turning now to FIGS. 5a-5f, some additional detail regarding how SPJG signatures integrate into the memo structure is provided. FIGS. 5a through 5e show trees in various stages of transformation. FIGS. 5f and 5g depict corresponding effects on the memo structure. A database associated with the depicted trees and memos contains the views $V_1:=B \bowtie D$, $V_2:=A \bowtie B \bowtie C \bowtie D$, and $V_3:=\gamma(C \bowtie V_1)$. FIG. 5a shows a query tree; FIG. 5f shows a memo structure (including group and group expression signature sets) corresponding to the tree of FIG. 5a. FIGS. 5b-5e depict a sequence of transformations applied to the query, resulting in the memo structure of FIG. 5g from which any of the trees in parts FIGS. 5a-5e can be extracted.

The numeric subscript on an operator in a tree is the operator's group number in the memo. For ease of explanation of the effects of the transformations, the new group expressions in the final memo show which transformation created the expression. For example, the transformation from FIG. 5a to 5b creates the new expression $C \bowtie B$. When the expression is added to the memo, it creates group expression 5.2, which is tagged with (a→b) to show when it was created. The signature for 5.2 (from FIG. 5g) is then created from the signatures of groups 3 and 2. Because the resulting signature already exists in the group, there is no need to propagate it upwards. However, when view $V_1$ is matched (part (d)), its insertion into group $g_9$ as 9.2 propagates a new SPJG signature into $\Sigma^{g9}$, $\Sigma^{g6}$ and $\Sigma^{g7}$. The process is similar for $V_3$ with respect to $\Sigma^{g7}$ and $\Sigma^{g8}$.

A query Q is supported by a collection S of materialized views if there exists a query $Q_V$ and a view $V \in S$ such that $Q \equiv Q_V$ and $Q_V$ is composed of the following operations: (i) selection, projection, and optionally aggregation that rolls up only across distinct values of parameterized columns against view V, if Q contains parameters, and (ii) projection against V only, if Q contains no parameters.

SPJG views support SPJG queries and SPJ queries with positive SPJ subqueries such as IN, exists, and ANY, when a key exists on the main query block. An SPJG query is supported by a view of the same definition. Parameterized SPJG queries are the same with the exception that the parameterized columns are added to the output columns of the view to allow for selection and possible re-aggregation to be applied. Support for SPJ queries with positive subqueries is also possible. Well-known rewritings can be used to convert a positive subquery to a (left-)semijoin that can be converted to an SPJG expression containing a join followed by a projection and group-by on the columns of the left hand side, provided that the left hand side has a key. Parameters are handled in the same fashion as for SPJG queries.

Stacked SPJG views can be used to support fast execution of these queries. In addition, stacking adds the ability to support nested aggregates, DISTINCT aggregates, HAVING clauses, scalar aggregate comparisons, albeit with some restrictions, and S-SPJG queries with positive S-SPJG subqueries. For example, in the case when a query uses output of an aggregation function as input to an operation such as a grouping column for a higher aggregation operator, the query can be supported by stacked SPJG views. Example 5 below provides additional detail:

EXAMPLE 5

Query Q classifies orders by the number of line items that each order contains with a particular return flag.

Q: select lcount, count(*)
    from orders,
        (select l_orderkey, count(*) lcount
        from lineitem
        where l_returnflag=@p1
        group by l_orderkey) AS X
    where l_orderkey=o_orderkey
    and o_orderdate>=@p2
    group by lcount
    order by lcount desc Q can be supported using the following views that add parameterized columns to the grouping and output columns of each level of view:

$V_1$: select l_orderkey, l_returnflag, count(*) lcount
    from lineitem
    group by l_orderkey, late
$V_2$: select lcount, l_returnflag
    o_orderdate, count(*) ocount
    from orders, $V_1$
    where l_orderkey=o_orderkey
    group by lcount, l_returnflag, o_orderdate
Q': select lcount, sum(ocount)
    from $V_2$
    where l_returnflag=@p1
    and o_orderdate>=@p2
    group by lcount
    order by lcount desc Adding parameterized columns to the grouping and output columns of relevant views to support a parameterized query essentially pulls a selection operator above an aggregation operator and is a correct transformation. However, this transformation is not generally valid for arbitrary combinations of range predicates and aggregation functions.

DISTINCT aggregates in a query that is possibly parameterized can be rewritten as a similarly parameterized S-SPJG query and thereby supported. Example 6 provides additional details:

EXAMPLE 6

Query Q counts the number of distinct customers that have ordered each part and can be supported by two views.
Q: select p_partkey, p_name, count(distinct o_custkey)
from part, lineitem, orders
where p_partkey=l_partkey
and l_orderkey=o_orderkey
group by p_partkey, p_name
$V_1$: select p_partkey, p_name, o_custkey
from part, lineitem, orders
where p_partkey=l_partkey
and l_orderkey=o_orderkey
group by p_partkey, p_name, o_custkey
$V_2$: select p_partkey, p_name, count(*)
from $V_1$
group by p_partkey, p_name
Q': select * from $V_2$ In the case when the query contains multiple aggregate functions of which one or more is DISTINCT, separate nested aggregate queries can be used to calculate each DISTINCT aggregate function. The outermost layer of the query joins all the results together using the grouping columns as join keys. HAVING clauses in SPJG view definitions are also supported. An SPJG query with a HAVING clause can be supported using a two level stacked view by converting a HAVING clause in one query block to a selection predicate in its parent block. Where possible, this approach is desirable to avoid selection predicates in the query rewrite because the need for a particular physical order to efficiently evaluate a predicate may conflict with a requested output ordering specified by an ORDER BY clause.

Comparisons against scalar aggregate subqueries that are uncorrelated and unparameterized can be converted to a join because the result of the subquery is guaranteed to be exactly one row. Further details are provided below in Example 7.

EXAMPLE 7

Query Q lists customers who account for at least 0.1% of total orders by value. This query can be supported by a collection of three views:
Q: select c_custkey, c_name, sum(o_totalprice) ordval
from customer, orders
where c_custkey=o_custkey
group by c_custkey, c_name
having sum(o_totalprice)>=0.001*
    (select sum(o_totalprice)
    from orders)
$V_1$: select sum(o_totalprice) totprice
from orders
$V_2$: select c_custkey, c_name, sum(o_totalprice) ordval
from customer, orders
where c_custkey=o_custkey
group by c_custkey, c_name
$V_3$: select c_custkey, c_name, ordval
from $V_1$, $V_2$
where ordval>=0.001*totprice
Q': select * from $V_3$ If the subquery is either correlated or parameterized, any view that could support it would have to add the correlated or parameterized column as a grouping and output column. This converts the scalar aggregation into non-scalar aggregation which may invalidate the rewrite from subquery to inner join. Scalar aggregation over an empty input still returns a row but a non-scalar aggregate returns an empty result. The transformation is valid only if the predicate applied to the subquery result rejects the value returned by the scalar aggregate when the subquery is empty. This example is correct because the sum returns null over an empty table and the >= predicate is null rejecting. This would not be correct if the aggregate was count because count returns 0 over an empty table which is not rejected by the >= predicate for all possible database instances.

The previously presented rewrite for positive subqueries requires that the semijoin between the main query block and the subquery block be converted to a group-by above a join to form a single SPJG block. Pulling the grouping above the join is the act that requires a key on the left hand side. The requirement that a single SPJG block be formed prevents the outer query from containing aggregation because any aggregation functions would have to be applied on the output of the group-by pushed up from the semijoin. This requirement also restricts the subquery to SPJ. The use of stacked views resolves these problems because a positive subquery can be rewritten to a nested aggregate query that leaves the grouping component of the semijoin below the join avoiding reliance on keys and enabling aggregation in the outer query. Additionally, the use of stacked views permits subqueries to be arbitrary S-SPJG queries. Further detail is provided in Example 8 below:

EXAMPLE 8

A query $Q_{17}$ contains a positive subquery with aggregation in both the outer and inner blocks. This query can be supported by two views as shown:
$Q_{17}$: select sum(l_extendedprice)/7.0 as avg_yearly
from lineitem, part
where p_partkey=l_partkey
and p_brand=@p1
and p_container=@p2
and l_quantity<
    (select 0.2*avg(l_quantity)
    from lineitem
    where l_partkey=p_partkey)
$V_1$: select l_partkey, sum(0.2*l_quantity) as wsum_qty,
count_big(*) as cnt
from lineitem
group by l_partkey
$V_2$: select p_brand, p_container,
sum (l_extendedprice) as sumprice,
count_big(*) as l_cnt
from lineitem l, part, $V_1$
where p_partkey=l.l_partkey
and v1.l_partkey=p_partkey
and l_quantity<(v1.wsum_qty/v1.cnt)
group by p_brand, p_container
$Q_{17}$: select sumprice/7.0 as avg_yearly
from $V_2$
where p_brand=@p1
and p_container=@p2

Figure 6:
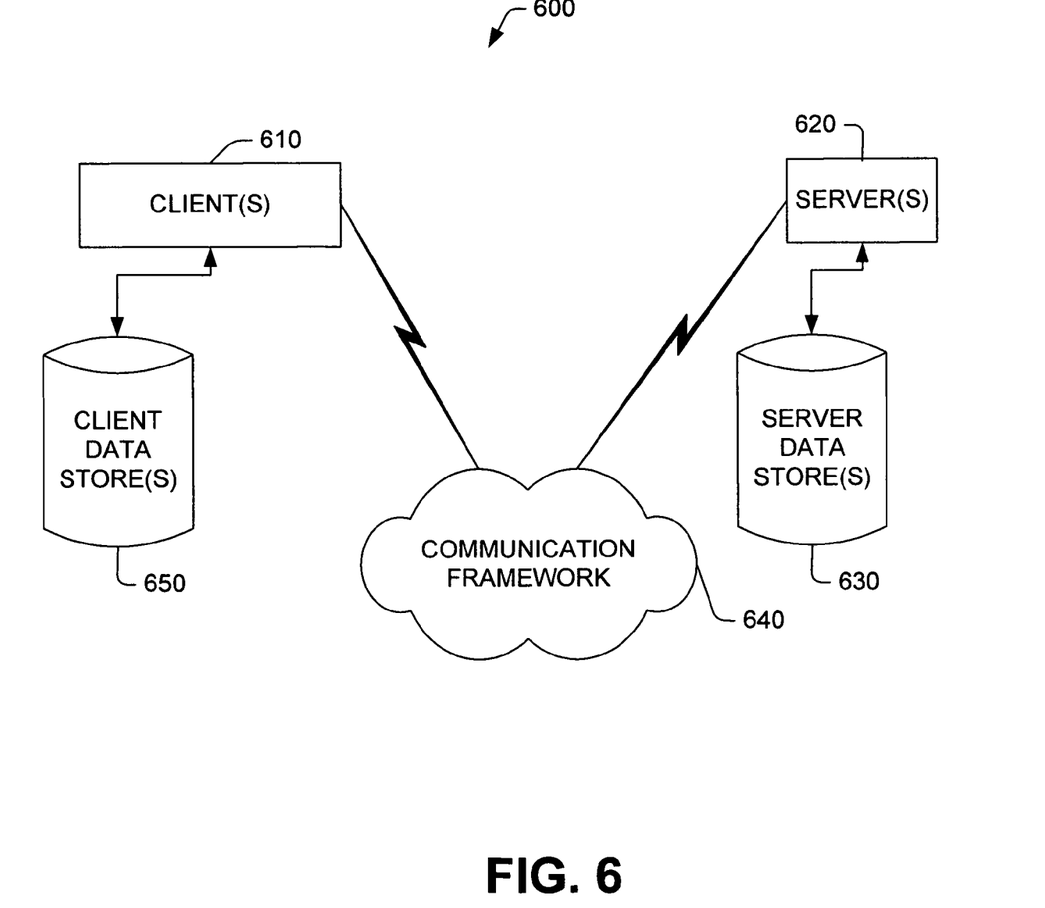
FIG. 6 illustrates a schematic block diagram of a sample-computing environment with which the subject invention can interact.
Figure 7:
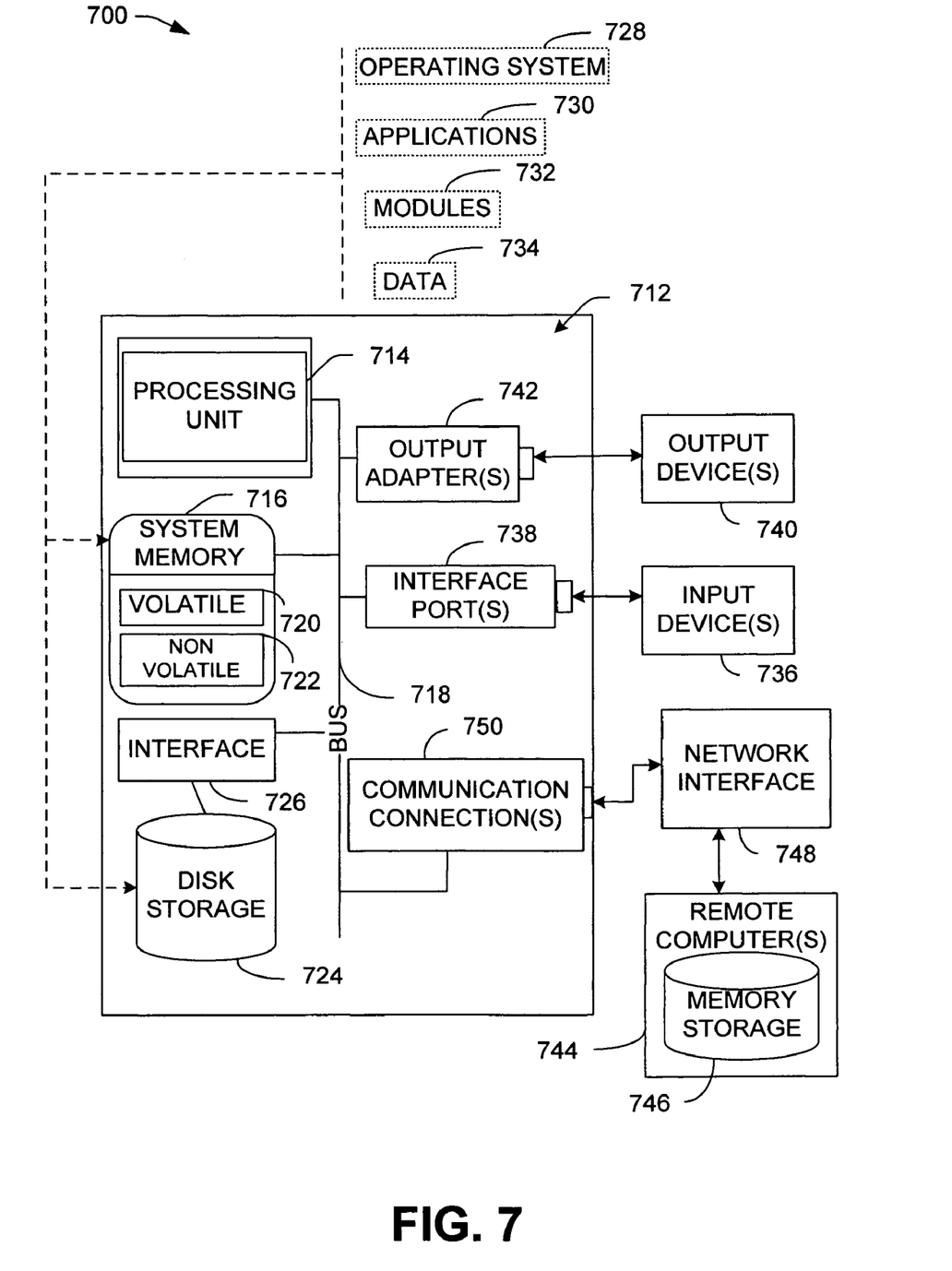
FIG. 7 illustrates an exemplary environment for implementing various aspects of the invention.

In order to provide additional context for implementing various aspects of the subject invention, FIGS. 6-7 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 6 is a schematic block diagram of a sample-computing environment 600 with which the subject invention can interact. The system 600 includes one or more client(s) 610. The client(s) 610 can be hardware and/or software (e.g., threads, processes, computing devices). The system 600 also includes one or more server(s) 620. The server(s) 620 can be hardware and/or software (e.g., threads, processes, computing devices). The servers 620 can house threads or processes to perform transformations by employing the subject invention, for example.

One possible means of communication between a client 610 and a server 620 can be in the form of a data packet adapted to be transmitted between two or more computer processes. The system 600 includes a communication framework 640 that can be employed to facilitate communications between the client(s) 610 and the server(s) 620. The client(s) 610 are operably connected to one or more client data store(s) 650 that can be employed to store information local to the client(s) 610. Similarly, the server(s) 620 are operably connected to one or more server data store(s) 630 that can be employed to store information local to the servers 640.

With reference to FIG. 7, an exemplary environment 700 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. For example, FIG. 7 illustrates a disk storage 724. The disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in the suitable operating environment 700. Such software includes an operating system 728. The operating system 728, which can be stored on the disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the subject invention can be implemented with various operating systems or combinations of operating systems.

A user enters commands or information into the computer 712 through input device(s) 736. The input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system for optimizing queries against a database, comprising:
   at least a processor executing the following components:
   a memo structure that encodes a plurality of query expressions frequently encountered in queries as a set of explored operator trees such that an operator tree comprises at least select, project, join and group-by operators;
   a signature mechanism that enables an assignment of the query expressions into equivalence classes, each class access the same set of base tables, wherein the signature data structure is a synopsis of the plurality of query expressions in the memo structure and is stored in the memo structure, the signature facilitates identification of at least one query expression from the memo structure that can be matched and substituted with at least a subset of a given query expression, the identified query expression is utilized to access a stacked materialized view of the database, wherein each signature for an operator tree in the memo structure is a tuple comprising at least an indication of whether a root of the corresponding operator tree is a group-by operator, a set of sources including tables and views used as input for operators with in the operator tree, and a set of candidate views for the operator tree; and
   wherein memory coupled to a processor retains the memo structure or the signature mechanism.

2. The system of claim 1, the query expressions of an equivalence class have common input sources.

3. The system of claim 2, the query optimizer is a transformation-based optimizer.

4. The system of claim 1, further comprising a query optimizer that uses the signature mechanism to identify at least one of the plurality of query expressions that can be substituted for an initial query expression.

5. The system of claim 4, further comprising a relational database that uses the query optimizer to access data.

6. The system of claim 5, the relational database includes a materialized view.

7. The system of claim 6, the at least one of the plurality of query expressions can reference the materialized view.

8. The system of claim 1, wherein the identified query expression a query minimizes amount of computation necessary to obtain results desired by a user.

9. A method for optimizing queries against a database, comprising:
   employing a processor to execute computer executable instructions stored in memory to perform the following acts:
   encoding a plurality of query expressions into a memo structure as a set of explored operator trees such that an operator tree comprises at least select, project, join and group-by operators;
   generating a signature for each of the operator trees such that the signature comprises boolean information corresponding to a root of an operator tree being a group-by operator, a set of sources including tables and views used as input for operators within the operator tree, and a set of candidate views for the operator tree; and
   identifying at least one of the plurality of query expressions that can be substituted for an initial query expression using the signature such that the identified query expression accesses at least a stacked materialized view of the database, and the signature assists in identifying the query expressions via input-distinct bindings of a corresponding operator tree when matching the stacked views and estimating potential that a single query operator from an operator tree corresponding to the given query expression will cause one or more materialized views to be matched;

substituting the identified query expression for the initial query expression; and using the identified query expression to access data of a relational database by accessing the stacked materialized view.

10. A computer implemented system for optimizing queries against a database, comprising the following computer executable components:

means for storing a plurality of query expressions frequently encountered in queries as a set of explored operator trees such that an operator tree comprises at least select, project, join and group-by operators;

means for identifying query expressions from the storing means that can be substituted for at least a subset of a given query expression to generate an optimized query such that the identified query expression is utilized to access a stacked materialized view of the database, the substitute query expressions are identified by determining bindings with different inputs for an operator tree corresponding to the given query expression when matching the stacked views and estimating potential that a single query operator from an operator tree corresponding to the given query expression will cause one or more materialized views to be matched, the identifying means comprises boolean information regarding a root of an operator tree corresponding to the identified query expression being a group-by operator, a set of sources including tables and views to be used as input for operators within the operator tree, and a set of candidate views for the operator tree; and means for displaying results obtained by executing the optimized query on at least one stacked materialized view of a relational database.

* * * * *